K, AS A FUNCTION OF
CUPRIC-CUPROUS RATIO
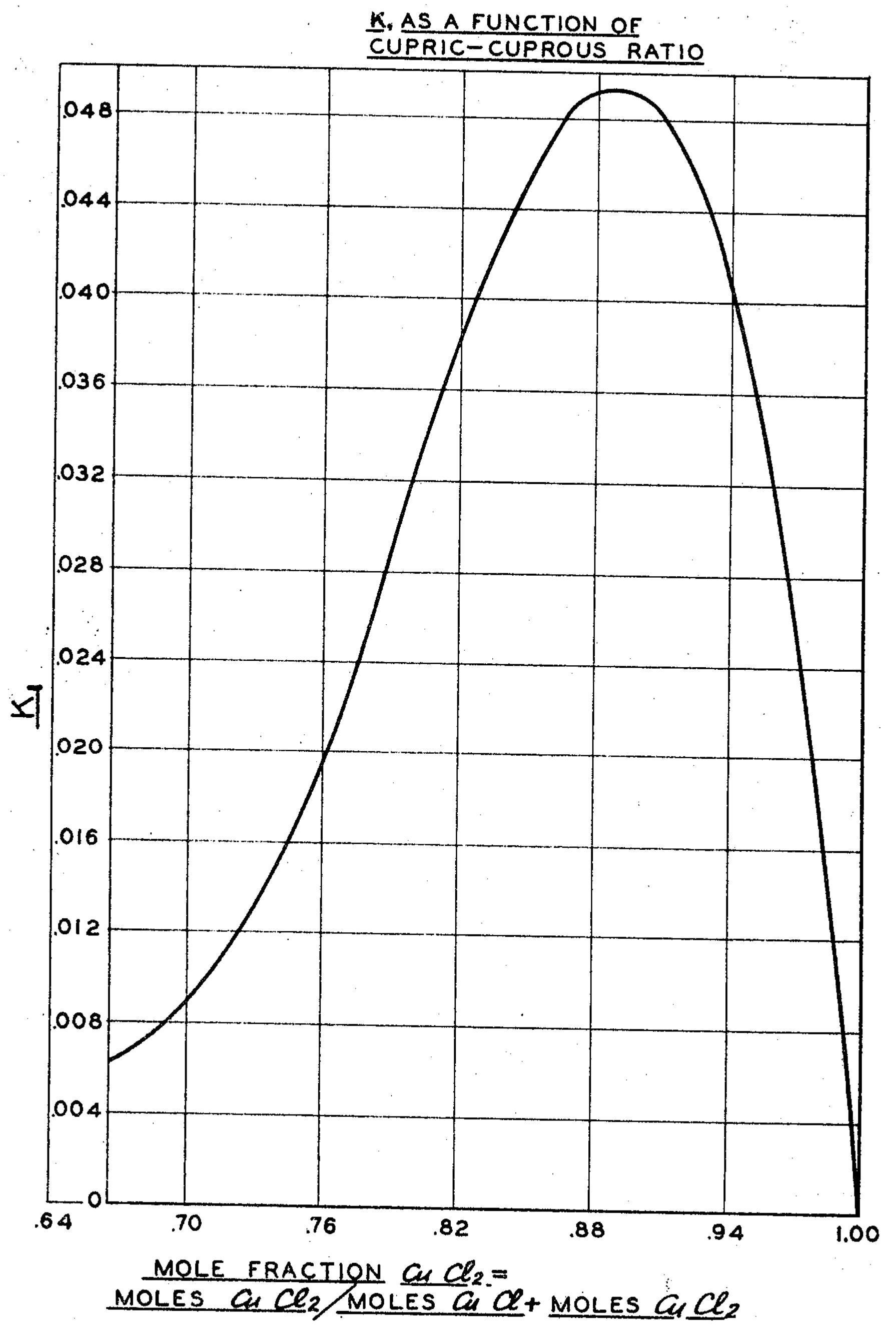
INVENTORS
HEINZ HEINEMANN
KENNETH D. MILLER, JR.
BY J.C. Quinlan
ATTORNEY
M. J. Mace
AGENT United States Patent Office 3,461,180
Patented Aug. 12, 1969

1

3,461,180
HALOGENATION OF ETHYLENE BY CONTACT WITH AQUEOUS CUPRIC-CUPROUS CHLORIDE SOLUTION

Heinz Heinemann and Kenneth D. Miller, Jr., Princeton, N.J., assignors to Pullman Incorporated, Chicago, Ill., a corporation of Delaware Continuation-in-part of application Ser. No. 199,329, June 1, 1962. This application Jan. 9, 1964, Ser. No. 336,776
The portion of the term of the patent subsequent to Oct. 26, 1982, has been disclaimed
Int. Cl. C07c 17/04
U.S. Cl. 260—659 9 Claims This application is a continuation-in-part of application Ser. No. 199,329 filed June 1, 1962, now Patent No. 3,214,481 issued Oct. 26, 1965.

This invention relates to a process for halogenating ethylene and in one aspect to the chlorination of ethylene to produce 1,2-dichloroethane.

The advantages of halogenating olefins in the presence of a catalyst in the liquid phase as compared with vapor phase and solid catalyst systems have been pointed out in previous applications such as, for example, in Ser. No. 199,329; Ser. No. 199,331 filed June 1, 1962, now Patent No. 3,214,482 issued Oct. 26, 1965; Ser. No. 263,412 filed Mar. 7, 1963, now abandoned; and in Ser. No. 304,953 filed Aug. 27, 1963, now abandoned. While the liquid-phase halogenation of an olefin such as ethylene in aqueous catalyst solutions achieves a higher selectivity to the dihalogenated paraffin product than other catalyst systems hereofore employed, it has been found that the conversion to dihalogenated product is generally low and, therefore, improvement in this aspect of the liquid-phase process is highly desirable.

At the present time, by far the most valuable product of ethylene chlorination is the 1,2-dichloroethane, which is a known intermediate in the production of vinyl chloride and which yields vinyl chloride more selectively than does 1,1-dichloroethane. Therefore, it is of prime importance in commercial processes to retain high selectivity to the 1,2-dichlorinated paraffin. A selectivity of about 99 percent has been obtainable with the aqueous cupric-cuprous chloride catalyst solutions although the percent conversion of ethylene to this desirable product is relatively low. Thus, it is of particular importance in the case of ethylene chlorination to develop a commercial process which achieves a high conversion of the olefin without sacrificing the greater than 95 percent selectivity to 1,2-dichloroethane which has been obtainable in the processes described in the copending applications recited above.

It is, therefore, an object of the present invention to provide an economic and commercially feasible process for halogenating ethylene to 1,2-dichloroethane in high conversion and with high selectivity.

Another object of the present invention is to markedly improve the yield of dichloroethane from ethylene which has been obtainable in other catalytic processes.

Still a further object of this invention is to provide a commercial process for the preparation of dichloroethane.

These and other objects of the present invention will become apparent to those skilled in the art from the accompanying description and disclosure.

According to the present invention, ethylene is chlorinated to the corresponding 1,2-dichloroethane in a high conversion and high selectivity by carrying out the chlorination at a temperature of between about 139° C. and 180° C. in the presence of an aqueous solution of cupric-cuprous chloride wherein the total copper concentration in solution is maintained between 5.5 moles per liter and

2 saturation, and the mole fraction of cupric chloride with respect to the total copper chlorides is maintained between 0.74 and 0.985. These limitations are critical for obtaining a high conversion of ethylene or a high space time yield of 1,2-dichloroethane. For the purposes of the present invention, space time yield (STY) expresses the homogeneous reaction rate as gram moles of product per liter of catalyst per hour. The mole fraction of cupric chloride is defined as the moles of cupric chloride divided by the total moles of cupric and cuprous chloride.

As stated above, the mole fraction of cupric chloride is maintained between 0.74 and 0.985. However, it has been found that when operating near the critical limits of this range, for example, with a mole fraction above 0.95 or below 0.76, the temperature should be maintained in the higher portion of the temperature range, for example, at 170° C. or above and/or the total copper as chloride in solution should be maintained above the minimum, for example, at about 8 moles per liter or above. In this way, a high STY of 1,2-dichloroethane, for example, above 0.4 will be maintained. It has also been found that when operating outside of the range of 0.74 to 0.985 mole fraction of cupric chloride, the STY to dichlorinated product drops off sharply. This can best be illustrated by the figure wherein it is shown that $K_1$, which is directly proportional to the STY of dichloroethane, drops drastically when operating outside of this critical range because the catalytic activity is of an extremely low order of magnitude.

The figure illustrates the effect of varying the mole fraction of cupric chloride outside and within the above critical limits. The curve, with respect to optimum activity, is independent of temperature and shows that the catalytic activity reported as STY of 1,2-dichloroethane product is a function of the mole fraction of cupric chloride. A sharp, unexpected rise in activity is observed when the mole fraction of cupric chloride is maintained between 0.74 and 0.98 mole fraction, reaching a maximum at a mole fraction of about 0.89. The preferred range of cupric chloride concentration is a cupric chloride mole fraction of between about 0.82 and 0.96 which encompasses the activity peak obtained at the various pressures and temperatures within the critical range. From this figure, it is possible to determine the activity or STY for any specific cupric chloride concentration within the critical range in the operation of the present invention. Generally, from the data obtained and presented hereinafter as working examples, it is concluded that in maintaining a high STY to 1,2-dichloroethane product, the degree of deviation of mole fraction cupric chloride from peak activity varies directly with increasing reaction temperature within the critical temperature range.

In addition to maintaining a suitable cupric chloride to cuprous chloride ratio in the reaction zone, the total copper concentration in the aqueous solution must also be maintained within critical limits and in accordance with the mole fraction of cupric chloride. The total copper in solution in the reaction is between about 5.5 molar and the saturation limit, for example, up to about 12 molar or higher provided precipitation of salt is avoided. The preferred concentration of total copper is above 7 moles per liter. When the total copper concentration falls below 7 moles per liter, the reaction is conducted at a temperature above 170° C. to obtain space time yields in excess of 0.5 gram mole/liter catalyst/hour.

The temperature of the chlorination reaction must be maintained between about 139° C. and about 180° C., preferably between about 150° C. and about 178° C. Below 135° or 136° C., it is difficult to maintain a satisfactory rate of reaction since sufficient copper cannot be brought into solution without precipitation problems. Also, at temperatures below about 135° or 136° C., the activity of the catalyst falls off markedly so that the space time yield (gram moles of product, per liter of catalyst per hour) is sharply decreased from about 0.4 to about half of this amount or less. Also from an economic standpoint, processes having low space time yields, for example, below 0.2 require contacting equipment of excessively large capacity to accommodate large volumes of the liquid reaction medium. Thus, in these systems handling of large volumes of liquid becomes a problem. At temperatures above 180° C., the selectivity to the 1,2-dichlorinated product falls off and the monochlorinated product and carbon dioxide become significant by-products of the reaction. Moreover, the monochlorinated product is not commercially useful in the production of vinyl chloride and, therefore, it is desirable to maintain production of monochloro product at a minimum. This aim is realized by observing the critical limitations of the present process.

The pressure of the reaction can be varied over a range which suitably maintains the liquid phase condition during the reaction. For example, pressures of from about 5 atmospheres to 35 atmospheres partial pressure of ethylene, preferably from 15 atmospheres to 25 atmospheres partial pressure of ethylene are beneficially employed in the present process.

Generally, for commercial operation, the process of the present invention is carried out in a continuous manner so that ethylene is continuously introduced into the reactor solution and 1,2-dichloroethane and unreacted ethylene are continuously removed from the reactor as a gaseous effluent. The mole fraction of cupric chloride can be maintained within desired limits by injection of hydrogen chloride and oxygen or an oxygen-containing gas into the reactor solution. The rate at which ethylene can be passed through the liquid catalyst solution varies from about 0.05 to about 1.0 foot per second gas velocity, preferably from about 0.2 to about 0.6 foot per second gas velocity. Although lower feed rates can be employed, rates within the above range are recommended in order to insure good agitition during reaction. Although operation in a continuous manner is economically advantageous, it is to be understood that batch operation can be employed, if desired. The preferred flow rates in a continuous process with ethylene recycle can vary between about 10 and about 90 gram moles of ethylene per liter per hour to provide ultimate conversions of between about 95 percent and 100 percent. It is desirable that the flow rate be sufficiently high to prevent separation problems due to product liquefaction. A reactor equipped with an agitator can be employed in order to achieve more efficient contacting time when ethylene velocities lower than 0.1 foot per second are desired.

The hydrogen ion concentration of the reaction mixtures which were measured at 90° C. showed pH values below 0 which indicates that a more negative value would be obtained at the higher temperatures of reaction since ionization of water and hydrolysis of cupric chloride is more pronounced at higher temperatures. However, this invention is not to be limited to operation at a pH below 0, for it is conceivable that the pH can be raised artificially by operating under a high oxygen pressure without detrimental affect to the reaction.

The following data is offered as a better understanding of the present invention to illustrate the critical conditions of the process with respect to the selective chlorination of ethylene to produce 1,2-dichloroethane in markedly improved space time yield. However, the following examples are not to be construed as limiting to the scope of the invention, for as indicated above, bromine can be substituted in any of the following examples to provide the corresponding 1,2-dibromoethane in selectivity of greater than 95 percent with similar space time yields.

TABLE I.—CHLORINATION OF ETHYLENE TO 1,2-DICHLOROETHANE AT 275 P.S.I. $C_2H_4$ IN THE PRESENCE OF AQUEOUS $CuCl_2$-CuCl SOLUTION

| Example No. | Total copper as $CuCl_2$-CuCl (moles per liter) | mole fraction $CuCl_2$ | Temperature, ° C. | $K_2$ | Flow rate, moles $C_2H_4$ per liter per hour | S.T.Y. (gram moles of product/liter of catalyst/hour) | Calculated percent conversion of $C_2H_4$ | Percent selectivity to 1,2-dichloro ethane |
|---|---|---|---|---|---|---|---|---|
| 1 | 7.0 | 1.00 | 150 | 0.0269 | 1.0 | >0.005 | ---------- | >99 |
| 2 | 6.2 | 0.968 | 150 | 0.0269 | 6.1 | 0.16 | ---------- | 99 |
| 3 | 4.66 | 0.965 | 150 | 0.0269 | 6.1 | 0.08 | ---------- | (2) |
| 4 | 7.25 | 0.965 | 150 | 0.0269 | 6.1 | 0.29 | ---------- | 99 |
| 5 | 7.25 | 0.85 | 150 | 0.0269 | 6.1 | 0.47 | 7.7 | 99 |
| 6 | 7.25 | 0.89 | 150 | 0.0269 | 6.1 | 0.51 | 8.5 | 99 |
| 7 | 7.5 | 0.934 | 150 | 0.0269 | 5.9 | 0.50 | 8.6 | 99 |
| 8 | 7.5 | 0.95 | 150 | 0.0269 | 5.9 | 0.42 | 7.1 | 99 |
| 9 | 7.5 | .89 | 150 | 0.0269 | 5.9 | 0.58 | 9.8 | 99 |
| 10 | 7.5 | 0.85 | 150 | 0.0269 | 5.9 | 0.53 | 9.0 | 99 |
| 11 | 7.5 | 0.80 | 150 | 0.0269 | 5.9 | 0.38 | 6.4 | 99 |
| 12 | 7.5 | 0.75 | 150 | 0.0269 | 5.9 | 0.19 | ---------- | 99 |
| 13 | 7.5 | 0.934 | 150 | 0.0269 | 9.9 | 0.50 | 5.0 | 99 |
| 14 | 7.5 | 0.95 | 150 | 0.0269 | 9.9 | 0.41 | ---------- | 99 |
| 15 | 7.5 | 0.89 | 150 | 0.0269 | 9.9 | 0.59 | 6.0 | 99 |
| 16 | 7.5 | 0.85 | 150 | 0.0269 | 9.9 | 0.53 | 5.5 | 99 |
| 17 | 7.5 | 0.80 | 150 | 0.0269 | 9.9 | 0.37 | ---------- | 99 |
| 18 | 7.5 | 0.75 | 150 | 0.0269 | 9.9 | 0.18 | ---------- | 99 |
| 19 | 10.05 | 0.878 | 150 | 0.0269 | 9.9 | 1.34 | ---------- | 99 |
| 20 | 10.05 | 0.95 | 150 | 0.0269 | 9.9 | 0.98 | 9.8 | 99 |
| 21 | 10.05 | 0.89 | 150 | 0.0269 | 9.9 | 1.34 | 12.6 | 99 |
| 22 | 10.05 | 0.85 | 150 | 0.0269 | 9.9 | 1.24 | 12.6 | 99 |
| 23 | 10.05 | 0.80 | 150 | 0.0269 | 9.9 | 0.88 | 8.9 | 99 |
| 24 | 10.05 | 0.75 | 150 | 0.0269 | 9.9 | 0.44 | ---------- | 99 |
| 25 | 8.0 | 0.875 | 150 | 0.0269 | 7.5 | 0.67 | 8.9 | 99 |
| 26 | 9.0 | 0.778 | 150 | 0.0269 | 5.3 | 0.49 | 9.6 | 99 |
| 27 | 8.0 | 0.695 | 150 | 0.0269 | 6.1 | 0.22 | ---------- | 99 |
| 28 | [1] 8.5 | 0 | 150 | 0.0269 | 6.1 | 0 | ---------- | 99 |
| 29 | 9.0 | 0.778 | 140 | 0.014 | 5.3 | 0.26 | ---------- | 99 |
| 30 | 9.0 | 0.89 | 140 | 0.014 | 5.3 | 0.58 | 10.9 | 99 |
| 31 | 6.2 | 0.968 | 160 | 0.046 | 6.1 | 0.28 | ---------- | 99 |
| 32 | 6.2 | 0.89 | 160 | 0.046 | 6.1 | 0.53 | 8.5 | 99 |
| 33 | 6.2 | 0.85 | 160 | 0.046 | 6.1 | 0.49 | 8.0 | 99 |
| 34 | 7.5 | 0.935 | 160 | 0.046 | 12.0 | 0.83 | 7.0 | 99 |
| 35 | 7.5 | 0.95 | 160 | 0.046 | 12.0 | 0.73 | 6.0 | 99 |
| 36 | 7.5 | 0.89 | 160 | 0.046 | 12.0 | 1.00 | 8.3 | 99 |
| 37 | 7.5 | 0.85 | 160 | 0.046 | 12.0 | 1.08 | 9.0 | 99 |
| 38 | 7.5 | 80 | 160 | 0.046 | 12.0 | 0.66 | 5.5 | 99 |
| 39 | 7.5 | 0.75 | 160 | 0.046 | 12.0 | 0.32 | ---------- | 99 |
| 40 | 9.0 | 0.890 | 170 | 0.075 | 12.0 | 2.7 | 22.5 | 99 |
| 41 | 8.0 | 0.89 | 175 | 0.100 | 12.0 | 2.5 | 20.5 | 99 |
| 42 | 5.0 | 0.90 | 170 | ---------- | 9.0 | 0.22 | ---------- | 97 |
| 43 | 6.0 | 0.94 | 170 | ---------- | 9.3 | 0.48 | ---------- | 96 |

[1] Solubilized with 7.5 molar $NH_4Cl$.

[2] The selectivity in this case was not measured since the extremely low STY indicated that the conditions employed in this reaction would not be suitable for the manufacture of 1,2-dichloroethane. However, alcohol was detected in the aqueous layer of the product effluent after condensation.

In each of the following Examples 1–43, 375 milliliters of cupric-cuprous chloride solution was made up and charged to a glass-lined metal reactor. Ethylene was introduced through a glass frit into the bottom of the reactor and bubbled upwardly through the copper chloride solution under about 275 p.s.i. partial pressure of ethylene.

The gaseous product effluent was removed overhead and its pressure reduced to atmospheric. The less volatile components in the gaseous mixture were condensed in a cold trap and separated into an organic and an aqueous layer; unreacted ethylene was passed through a wet meter and then vented as a gas to the atmosphere. The organic layer, which is 1,2-dichloroethane, was then subjected to gas chromographic analysis. As indicated by the selectivity in the following table, the results of this analysis showed a percent selectivity greater than 99 percent to 1,2-dichloroethane.

As shown in Table I, the percent conversion of each of the examples can be improved by lowering the flow rate while maintaining the other conditions of the reaction. The percent conversion is presented here for purposes of comparing the presently improved process with processes which do not employ the aqueous cupric-cuprous chloride systems presented hereinafter in Table III.

Also from the data presented above in Table I, it is found than when aqueous cupric chloride is used alone and is solubilized with 7.5 molar ammonium chloride (as in Example 28), substantially no conversion to 1,2-dichloroethane was obtained. Example 1 illustrates the effect of employing a mole fraction of cupric chloride outside the critical range set forth above, while maintaining other critical conditions of temperature and total copper well within the ranges prescribed. However, it will be noted that in Example 1, the STY has dropped off markedly to only a few thousandths of a gram mole of 1,2-dichloroethane per liter per hour. Examples 3 and 42 show the effect of employing a total copper concentration outside of the critical ranges set forth herein, while maintaining other conditions of operation well within the critical limits. Here again, STY has fallen off sharply so that in Example 3, only a few hundredths of a gram mole of dichloroethane per liter per hour is obtained and in Example 42, the STY is still low. A few experiments, not reported in this table, were carried out at a temperature of about 185° C., however, oxidation was observed in each case during reaction and substantial yields of carbon dioxide were obtained, thus seriously affecting the percent selectivity to 1,2-dichloroethane.

As for the other examples which failed to measure up to the 0.4 STY, such as Examples 2, 4, 12, 27, 29, 31 and 39, it will be noted that in each case either the total copper concentration or the mole fraction of cupric chloride indicated a need for higher reaction temperature as recommended in the foregoing discussion.

From the data presented above, the following equation was developed for determining the STY and its relationship to other reaction variables under the conditions of the present process.

$STY = K_1 \cdot K_2$ (molarity of total copper)$^3$; wherein $K_1$ is a function of the mole fraction of cupric chloride with respect to total copper and can be obtained from the curve of the figure by reading off the values on the ordinate, corresponding to the mole fraction of cupric chloride appearing on the abscissa; and $K_2$ is the apparent reaction rate constant, values of which are presented below in Table II for various operating temperatures within the critical range. However, it is to be understood that the $K_2$ of temperatures intermediate to those reported, can be determined by interpolation.

TABLE II

| Temperature, ° C. | $K_2$ value |
|---|---|
| 140 | 0.0143 |
| 150 | 0.0269 |
| 160 | 0.0470 |
| 170 | 0.0810 |
| 180 | 0.1430 |

Examples 44 and 45

Into each of two glass-lined metal reactors, 1 liter of 6 molar aqueous ferric chloride solution was introduced. Ethylene was continuously bubbled through each of the aqueous solutions in the reactors and the results of these reactions are found in the following table, Table III.

Examples 46 and 47

Into each of two glass-lined metal reactors, 1 liter of 4.6 molar ferric chloride-1.2 molar cupric chloride in aqueous solution was introduced. Ethylene was continously bubbled through each of the aqueous solutions in the reactors and the results of these reactions are also reported in the following table, Table III.

TABLE III

| Example No. | Flow rate, mole/liter/hour | Temperature of reaction, ° C. | Partial pressure $C_2H_4$ in p.s.i. | STY* (gram moles of total product/liter of catalyst/hour) | Percent Conversion of ethylene to total product | Selectivity |
|---|---|---|---|---|---|---|
| 44 | 1.2 | 150 | 250 | 0 | 0 | |
| 45 | 1.3 | 180 | 250 | .04 | 3.0 | 88% ethyl chloride, 8% carbon dioxide, 4% dichloroethane. |
| 46 | 7 | 175 | 260 | 0.38 | 5.4 | 10% ethyl chloride, 90% dichloroethane. |
| 47 | 5 | 150 | 285 | 0.13 | 2.6 | 3% ethyl chloride, 97% dichloroethane. |

$$*STY = \frac{\text{flow rate} \times \text{conversion of ethylene}}{100}.$$

From the above table, it is found that the results of these experiments which employ an aqueous catalyst medium other than the aqueous cupric-cuprous chloride show a greatly reduced STY and percent conversion with the exception of Examples 46. However, it is noted in Example 46 that the selectively to dichloroethane is seriously degraded and thus the benefits of the present improved process are not realized. In view of these findings, it is apparent that the aqueous cupric-cuprous chloride solution is unique in achieving the advantages of the present process namely in achieving a high STY while at the same time retaining selectivity to dichloroethane above 95 percent.

Having thus described our invention we claim:

1. The process for chlorinating ethylene which comprises contacting ethylene at a temperature between about 139° C. and about 180° C. with an aqueous solution of cupric-cuprous chloride wherein the total copper concentration is maintained between 5.5 moles per liter and saturation and the cupric chloride mole fraction is maintained between 0.74 and 0.985.

2. The process for chlorinating ethylene which comprises contacting ethylene at a temperature between 139° C. and 180° C. with an aqueous solution of cupric-cuprous chloride wherein the total copper concentration is maintained between 7 moles per liter and saturation and the cupric chloride mole fraction is maintained between 0.82 and 0.96 and reacting ethylene in the liquid phase to produce 1,2-dichloroethane in greater than 95 percent selectivity.

3. The process for chlorinating ethylene which comprises contacting ethylene at a temperature between 139° C. and 180° C. with an aqueous solution of cupric-cuprous chloride wherein the total copper concentration is maintained between 5.5 moles per liter and saturation and the cupric chloride mole fraction is maintained between 0.74 and 0.985 and reacting ethylene in the liquid phase which is maintained at a pH below 0 to produce 1,2-dichloroethane.

4. The process for chlorinating ethylene which comprises contacting ethylene at a temperature between 150° C. and 178° C. with an aqueous solution of cupric-cuprous chloride wherein the total copper concentration is maintained between 5.5 moles per liter and saturation and the cupric chloride mole fraction is maintained between 0.74 and 0.985 and reacting ethylene in the liquid phase which is maintained at a pH below 0 to produce 1,2-dichloroethane in greater than 95 percent selectivity.

5. The process for chlorinating ethylene which comprises reacting ethylene in the liquid phase at a pH below 0 and at a temperature between 150° C. and 178° C. with an aqueous solution of cupric-cuprous chloride wherein the total copper concentration is maintained between 7 moles per liter and saturation and the cupric chloride mole fraction is maintained between 0.82 and 0.96 to produce 1,2-dichloroethane in greater than 95 percent selectivity and an STY greater than 0.4 gram mole per liter of solution per hour.

6. The process for chlorinating ethylene to 1,2-dichloroethane which comprises passing ethylene at a rate of from about 0.2 to about 0.6 foot per second gas velocity through an aqueous solution of cupric-cuprous chloride wherein the total copper concentration is maintained between 7 moles per liter and saturation and the cupric chloride mole fraction is maintained between 0.82 and 0.96 at a reaction temperature of between about 139° C. and about 180° C. and at a solution pH below 0.

7. The process for chlorinating ethylene to 1,2-dichloroethane which comprises passing ethylene at a rate of from about 0.05 to about 1.0 foot per second gas velocity through an aqueous solution of cupric-cuprous chloride wherein the total copper concentration is maintained between 5.5 moles per liter and saturation and the cupric chloride mole fraction is maintained between 0.74 and 0.985 at a reaction temperature of between about 139° C. and about 180° C. and at a solution pH below 0 whereby 1,2-dichloroethane is produced in greater than 95 percent selectivity.

8. The process for chlorinating ethylene which comprises contacting ethylene under a partial pressure of between about 5 and about 35 atmospheres at a temperature of between about 139° C. and about 180° C. with an aqueous solution of cupric-cuprous chloride wherein the total copper concentration is maintained between 5.5 moles per liter and saturation of the cupric chloride mole fraction is maintained between 0.74 and 0.985.

9. The process for chlorinating ethylene which comprises contacting ethylene under a partial pressure between about 15 and 25 atmospheres at a temperature between 139° C. and 180° C. with an aqueous solution of cupric-cuprous chloride wherein the total copper concentration is maintained between 5.5 moles per liter and saturation of the cupric chloride mole fractionation is maintained between 0.82 and 0.96 and reacting ethylene in the liquid solution having a pH below 0 to produce 1,2-dichloroethane in greater than 95 percent selectivity.

References Cited

UNITED STATES PATENTS

| | | | |
|---|---|---|---|
| 1,963,761 | 6/1934 | Prahl | 260—650 |
| 2,310,283 | 2/1943 | Gilliland | 260—663 |
| 2,399,488 | 4/1946 | Hearne | 260—659 |
| 2,644,846 | 7/1953 | Johnson et al. | 260—659 |
| 2,755,315 | 7/1956 | Eberly | 260—656 |
| 2,779,805 | 1/1957 | Millard | 260—654 |
| 2,809,221 | 10/1957 | Thomas et al. | 260—654 |
| 2,822,410 | 2/1958 | Wojcik et al. | 260—654 |
| 2,875,255 | 2/1959 | Eberly | 260—656 |
| 2,915,565 | 12/1959 | Jacobowsky et al. | 260—654 |
| 3,055,955 | 9/1962 | Hodges | 260—659 |
| 3,079,444 | 2/1963 | Jacobowsky et al. | 260—654 |
| 3,194,847 | 7/1965 | Capp et al. | 260—656 |
| 3,197,515 | 7/1965 | Chassaing | 260—654 |
| 3,214,481 | 10/1965 | Heinemann et al. | 260—659 |

FOREIGN PATENTS

| | | |
|---|---|---|
| 451,379 | 9/1948 | Canada. |
| 517,009 | 9/1955 | Canada. |
| 1,309,610 | 10/1962 | France. |
| 254,536 | 12/1948 | Switzerland. |

LEON ZITVER, Primary Examiner

T. G. DILLAHUNTY, Assistant Examiner

U.S. Cl. X.R.

260—656